(12) United States Patent
Ishida et al.

(10) Patent No.: US 12,486,415 B2
(45) Date of Patent: *Dec. 2, 2025

(54) INK JET TEXTILE-PRINTING INK COMPOSITION, RECORDING METHOD, AND RECORDED MATERIAL

(71) Applicant: SEIKO EPSON CORPORATION, Tokyo (JP)

(72) Inventors: Kohei Ishida, Matsumoto (JP); Yasuhiro Oki, Matsumoto (JP); Tomohiro Aruga, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 191 days.

This patent is subject to a terminal disclaimer.

(21) Appl. No.: 18/111,624

(22) Filed: Feb. 20, 2023

(65) Prior Publication Data

US 2023/0265304 A1  Aug. 24, 2023

(30) Foreign Application Priority Data

Feb. 21, 2022  (JP) ................. 2022-024471

(51) Int. Cl.
| | |
|---|---|
| *C09D 11/328* | (2014.01) |
| *B41J 2/01* | (2006.01) |
| *B41J 2/21* | (2006.01) |
| *B41M 5/00* | (2006.01) |
| *C09D 11/38* | (2014.01) |
| *D06P 1/48* | (2006.01) |
| *D06P 5/30* | (2006.01) |

(52) U.S. Cl.
CPC .............. *C09D 11/328* (2013.01); *B41J 2/01* (2013.01); *B41J 2/2107* (2013.01); *B41M 5/00* (2013.01); *C09D 11/38* (2013.01); *D06P 5/30* (2013.01); *D06P 1/48* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 6,727,296 B1 * | 4/2004 | Pears ................ | C09D 11/32 523/160 |
| 9,102,158 B2 * | 8/2015 | Aruga ............... | B41J 2/16552 |
| 2006/0055750 A1 * | 3/2006 | Taguchi ............ | C09D 11/328 347/100 |
| 2006/0055753 A1 * | 3/2006 | Sekiguchi ......... | B41J 2/17553 347/100 |
| 2008/0196178 A1 * | 8/2008 | Diekmann ......... | C09D 11/328 106/31.47 |
| 2009/0035467 A1 * | 2/2009 | Sekiguchi ......... | C09D 11/38 427/256 |
| 2011/0092624 A1 * | 4/2011 | Sao ................... | C09D 11/328 106/31.44 |
| 2019/0100669 A1 * | 4/2019 | Murai ............... | B41M 5/0023 |
| 2020/0122486 A1 * | 4/2020 | Imamura ........... | B41J 2/01 |
| 2021/0301155 A1 | 9/2021 | Oki et al. | |

FOREIGN PATENT DOCUMENTS

| | | |
|---|---|---|
| CN | 113462231 A | 10/2021 |
| JP | 2002-348504 A | 12/2002 |
| JP | 2003-503535 A | 1/2003 |
| JP | 2019-085577 A | 6/2019 |
| WO | 2000-078876 A1 | 12/2000 |

* cited by examiner

*Primary Examiner* — Manish S Shah

(74) *Attorney, Agent, or Firm* — Harness, Dickey & Pierce, P.L.C.

(57) ABSTRACT

An ink jet textile-printing ink composition according to the present disclosure contains an acidic dye having water solubility of 30 g/L or less at 20° C., a water-soluble organic solvent, and water, wherein a glycol-based solvent and a cyclic-amide-based solvent are contained as the water-soluble organic solvent, and the cyclic-amide-based solvent contains one or both of ε-caprolactam and N-hydroxyethyl-2-pyrrolidone.

9 Claims, No Drawings

INK JET TEXTILE-PRINTING INK COMPOSITION, RECORDING METHOD, AND RECORDED MATERIAL

The present application is based on, and claims priority from JP Application Serial Number 2022-024471, filed Feb. 21, 2022, the disclosure of which is hereby incorporated by reference herein in its entirety.

BACKGROUND

1. Technical Field

The present disclosure relates to an ink jet textile-printing ink composition, a recording method, and a recorded material.

2. Related Art

In recent years, ink jet printing has been widely used and applied to office and home printers, and, in addition, to commercial printing, textile printing, and the like.

Ink jet inks are required to have excellent ejection reliability with respect to an ink jet method so as to form a predetermined pattern.

In this regard, an ink jet textile-printing ink composition serving as an ink jet ink which is applied to a fabric is also used.

In particular, regarding the ink jet textile-printing ink composition which is applied to a fabric, using an acidic dye having high hydrophobicity provides advantages since the resulting recorded material can have favorable wet color fastness (refer to, for example, JP-A-2002-348504).

However, regarding the ink jet textile-printing ink composition in the related art, when an acidic dye having high hydrophobicity is used, since the dye has low solubility, plugging of a nozzle tends to occur, and there is a problem in terms of poor ejection reliability with respect to an ink jet method.

SUMMARY

The present disclosure addresses the above-described problems and can be realized by the application examples below.

According to an application example of the present disclosure, an ink jet textile-printing ink composition contains an acidic dye having water solubility of 30 g/L or less at 20° C., a water-soluble organic solvent, and water, wherein a glycol-based solvent and a cyclic-amide-based solvent are contained as the water-soluble organic solvent, and the cyclic-amide-based solvent contains one or both of ε-caprolactam and N-hydroxyethyl-2-pyrrolidone.

According to another application example of the present disclosure, in the ink jet textile-printing ink composition, the content of the glycol-based solvent is 10% by mass or more.

According to another application example of the present disclosure, in the ink jet textile-printing ink composition, the content of the cyclic-amide-based solvent is 0.5% by mass or more.

According to another application example of the present disclosure, in the ink jet textile-printing ink composition, the acidic dye is at least one selected from the group consisting of C.I. Acid Red 138, C.I. Acid Blue 140, C.I. Acid Red 407, C.I. Acid Violet 97, and C.I. Acid Violet 54.

According to another application example of the present disclosure, in the ink jet textile-printing ink composition, a compound having a glycol structure and a compound having a glycol ether structure are contained as the glycol-based solvent.

According to another application example of the present disclosure, in the ink jet textile-printing ink composition, the glycol-based solvent is at least one selected from the group consisting of diethylene glycol, triethylene glycol, dipropylene glycol, tripropylene glycol, triethylene glycol monobutyl ether, diethylene glycol monobutyl ether, dipropylene glycol monobutyl ether, and dipropylene glycol monopropyl ether.

According to another application example of the present disclosure, in the ink jet textile-printing ink composition, a content of the acidic dye is 7.0% by mass or less.

According to another application example of the present disclosure, the ink jet textile-printing ink composition further contains a surfactant with a content of 0.4% by mass or more.

According to an application example of the present disclosure, a recording method includes an ejection step of ejecting the ink jet textile-printing ink composition according to the application example of the present disclosure by an ink jet method so as to attach the ink jet textile-printing ink composition to a fabric and a dyeing step of fixing the acidic dye to the fabric.

According to an application example of the present disclosure, a recorded material includes a colored portion due to the ink jet textile-printing ink composition according to the application example of the present disclosure applied to a fabric by an ink jet method.

DESCRIPTION OF EXEMPLARY EMBODIMENTS

The exemplary embodiments of the present disclosure will be described below in detail.

1. Ink Jet Textile-Printing Ink Composition

To begin with, an ink jet textile-printing ink composition according to the present disclosure will be described.

The ink jet textile-printing ink composition according to the present disclosure contains an acidic dye having water solubility of 30 g/L or less at 20° C., a water-soluble organic solvent, and water. In this regard, a glycol-based solvent and a cyclic-amide-based solvent are contained as the water-soluble organic solvent, and the cyclic-amide-based solvent contains one or both of ε-caprolactam and N-hydroxyethyl-2-pyrrolidone.

Using such an acidic dye having high hydrophobicity enables the resulting recorded material to have excellent wet color fastness, and, in addition, using a predetermined organic solvent in combination makes it difficult for plugging in an ink jet nozzle to occur, enables the solid content of the ink jet textile-printing ink composition to have favorable resolubility, even when the solid content is precipitated, and enables the ejection reliability with respect to the ink jet method to become excellent.

1-1. Acidic Dye

The ink jet textile-printing ink composition according to the present disclosure contains, as a coloring material, an acidic dye having water solubility of 30 g/L or less at 20° C.

Using such an acidic dye having high hydrophobicity enables the resulting recorded material to have favorable wet color fastness.

The ink jet textile-printing ink composition according to the present disclosure contains, as a coloring material, an acidic dye having water solubility of 30 g/L or less at 20° C.

The water solubility at 20° C. of the acidic dye is preferably 1 g/L or more and 25 g/L or less and more preferably 2 g/L or more and 20 g/L or less.

Consequently, the above-described effects are more markedly exerted.

Examples of the acidic dye having water solubility of 30 g/L or less at 20° C. include C.I. Acid Red 138, C.I. Acid Blue 140, C.I. Acid Red 407, C.I. Acid Violet 97, and C.I. Acid Violet 54, and at least one selected from these can be used alone or in combination. Of these, at least one selected from the group consisting of C.I. Acid Red 138, C.I. Acid Blue 140, C.I. Acid Red 407, C.I. Acid Violet 97, and C.I. Acid Violet 54 may be used.

Consequently, the above-described effects of the present disclosure are more markedly exerted.

The content of the acidic dye in the ink jet textile-printing ink composition is preferably 7.0% by mass or less, more preferably 1.0% by mass or more and 6.0% by mass or less, and further preferably 1.5% by mass or more and 5.5% by mass or less.

Consequently, regarding a recorded portion formed using the ink jet textile-printing ink composition, a sufficient color density is readily ensured and, in addition, the ejection reliability of the ink jet textile-printing ink composition with respect to the ink jet method can be made more excellent.

1-2. Water

The ink jet textile-printing ink composition according to the present disclosure contains water.

The water is, for example, a component that functions as a solvent for dissolving a coloring material or a dispersion medium for dispersing a coloring material in the ink jet textile-printing ink composition.

In addition, the ink jet textile-printing ink composition containing water enables a glycol-based solvent and a cyclic-amide-based solvent, described later in detail, to be uniformly contained in the ink jet textile-printing ink composition and enables functions of these to be effectively exerted.

The content of the water in the ink jet textile-printing ink composition is preferably 40.0% by mass or more and 89.0% by mass or less, more preferably 43.0% by mass or more and 85.0% by mass or less, and further preferably 55.0% by mass or more and 80.0% by mass or less.

Consequently, the viscosity of the ink jet textile-printing ink composition can be more reliably adjusted to a favorable value, and the ejection reliability with respect to the ink jet method can be further improved.

1-3. Water-Soluble Organic Solvent

The ink jet textile-printing ink composition according to the present disclosure contains a predetermined water-soluble organic solvent. More specifically, a glycol-based solvent and a cyclic-amide-based solvent are contained as the water-soluble organic solvent, and the cyclic-amide-based solvent contains one or both of ε-caprolactam and N-hydroxyethyl-2-pyrrolidone.

Using such a water-soluble organic solvent in combination with the above-described acidic dye having high hydrophobicity enables the acidic dye to be contained in the ink jet textile-printing ink composition while taking on a favorable state, makes it difficult for plugging in an ink jet nozzle to occur, enables the solid content of the ink jet textile-printing ink composition to have favorable resolubility, even when the solid content is precipitated, and enables the ejection reliability with respect to the ink jet method to become excellent.

1-3-1. Glycol-Based Solvent

The glycol-based solvent as the water-soluble organic solvent contained in the ink jet textile-printing ink composition according to the present disclosure is a compound having a glycol structure (that is, a chemical structure in which a carbon-bound hydrogen atom of each of two carbon atoms included in an aliphatic hydrocarbon having at least two carbon atoms in the molecule is substituted with a hydroxy group) or a compound having a structure in which a plurality of the above-described compounds are condensed (that is, a chemical structure having at least one ether oxygen atom in the molecule and, in addition, having two hydroxy groups bonded to a hydrocarbon group), wherein the compound in the state of being dissolved in the water is contained in the ink jet textile-printing ink composition.

Examples of the compound having a glycol structure include diethylene glycol, triethylene glycol, dipropylene glycol, tripropylene glycol, 1,2-butanediol, 1,2-pentanediol, 1,2-hexanediol, 1,2-heptanediol, 1,3-propanediol, 1,3-butanediol, 1,4-butanediol, 1,5-pentanediol, 1,6-hexanediol, 2-ethyl-2-methyl-1,3-propanediol, 2-methyl-1,3-propanediol, 2,2-dimethyl-1,3-propanediol, 3-methyl-1,3-butanediol, 3-methyl-1,5-pentanediol, and 2-methylpentane-2,4-diol, and examples of the compound having a glycol ether include triethylene glycol monobutyl ether, diethylene glycol monobutyl ether, dipropylene glycol monobutyl ether, and dipropylene glycol monopropyl ether.

Consequently, the above-described effects according to the present disclosure are more markedly exerted.

Regarding the above-described compounds, when triethylene glycol monobutyl ether is contained, the above-described effects are still more markedly exerted.

In particular, the ink jet textile-printing ink composition may contain the compound having a glycol structure and the compound having a glycol ether structure as the glycol-based solvent.

Consequently, tailing when the ink jet textile-printing ink composition is ejected by the ink jet method can be more favorably reduced.

When the ink jet textile-printing ink composition contains the compound having a glycol structure and the compound having a glycol ether structure as the glycol-based solvent, the following condition may be satisfied. That is, the content of the compound having a glycol ether structure relative to 100 parts by mass of the compound having a glycol structure is preferably 50 parts by mass or more and 300 parts by mass or less, more preferably 60 parts by mass or more and 280 parts by mass or less, and further preferably 70 parts by mass or more and 260 parts by mass or less.

Consequently, the above-described effects are more markedly exerted.

The content of the glycol-based solvent in the ink jet textile-printing ink composition is preferably 10% by mass or more, more preferably 12% by mass or more and 50% by mass or less, and further preferably 14% by mass or more and 25% by mass or less.

Consequently, the solubility of the acidic dye becomes more favorable, and tailing when the ink jet textile-printing ink composition is ejected by the ink jet method can be more favorably reduced.

1-3-2. Cyclic-Amide-Based Solvent

The cyclic-amide-based solvent serving as a water-soluble organic solvent contained in the ink jet textile-printing ink composition according to the present disclosure is a compound having a chemical structure of a cyclic amide in the molecule, wherein the compound in the state of being dissolved in the water is contained in the ink jet textile-printing ink composition. Examples of the chemical structure of a cyclic amide include a lactam structure and a cyclic urea structure.

In particular, the ink jet textile-printing ink composition according to the present disclosure contains one or both of ε-caprolactam and N-hydroxyethyl-2-pyrrolidone as the cyclic-amide-based solvent.

The content of the cyclic-amide-based solvent in the ink jet textile-printing ink composition is preferably 0.5% by mass or more, more preferably 1.0% by mass or more and 5.0% by mass or less, and further preferably 1.5% by mass or more and 4.0% by mass or less.

Consequently, tailing when the ink jet textile-printing ink composition is ejected by the ink jet method can be more favorably reduced.

The ink jet textile-printing ink composition according to the present disclosure may further contain other cyclic-amide-based solvents in addition to one or both of ε-caprolactam and N-hydroxyethyl-2-pyrrolidone.

Examples of the other cyclic-amide-based solvent include 2-pyrrolidone, N-methyl-2-pyrrolidone, 1,3-dimethyl imidazolidinone, 2-piperidone (δ-valerolactam), and N-cyclohexyl-2-pyrrolidone.

In this regard, the content of the other cyclic-amide-based solvent in the total cyclic-amide-based solvents contained in the ink jet textile-printing ink composition is preferably 10% by mass or less, more preferably 5% by mass or less, and further preferably 2% by mass or less. The lower limit value of the content of the other cyclic-amide-based solvent in the total cyclic-amide-based solvents contained in the ink jet textile-printing ink composition is 0% by mass.

Preferably $1.5 \leq XG/XL \leq 50.0$, more preferably $2.4 \leq XG/XL \leq 40.0$, and further preferably $3.5 \leq XG/XL \leq 16.6$, wherein the content of the glycol-based solvent in the ink jet textile-printing ink composition is denoted as XG (% by mass), and the content of the cyclic-amide-based solvent is denoted as XL (% by mass).

Consequently, the above-described effects of the present disclosure are more markedly exerted.

1-3-3. Other Water-Soluble Organic Solvents

The ink jet textile-printing ink composition according to the present disclosure contains the above-described glycol-based solvent and cyclic-amide-based solvent and, in addition, may further contain other water-soluble organic solvents.

Examples of the other water-soluble organic solvent include glycerin.

When the ink jet textile-printing ink composition contains glycerin, the content of the glycerin in the ink jet textile-printing ink composition is preferably 1% by mass or more and 25% by mass or less, more preferably 3% by mass or more and 20% by mass or less, and further preferably 5% by mass or more and 15% by mass or less.

When the ink jet textile-printing ink composition contains the above-described other water-soluble organic solvent except for glycerin, the content of the above-described other water-soluble organic solvent except for glycerin in the ink jet textile-printing ink composition is preferably 10% by mass or less, more preferably 5% by mass or less, and further preferably 2% by mass or less. In this regard, the lower limit value of the content of the above-described other water-soluble organic solvent except for glycerin in the ink jet textile-printing ink composition is 0% by mass.

1-4. Surfactant

The ink jet textile-printing ink composition according to the present disclosure may further contain a surfactant in addition to the above-described components.

Consequently, the ejection reliability of the ink jet textile-printing ink composition with respect to the ink jet method can be made more excellent.

Regarding the surfactant, various surfactants, such as anionic surfactants, cationic surfactants, and nonionic surfactants, can be used.

Specific examples of the surfactant include Surfynol MD-20, Surfynol 82, and Surfynol DF110D (2,5,8,11-tetramethyl-6-dodecyne-5,8-diol), and, in addition, OLFIN 104 Series and E Series of OLFIN E1010, OLFIN EXP4300 (ethylene oxide adduct with a carbon number of 12), Surfynol 61, Surfynol 465, Surfynol 104S, Surfynol 104PG50 (2,4,7,9-tetramethyl-5-decyne-4,7-diol), Surfynol 420 (trade name, produced by Air Products Japan, Inc.), OLFIN E1010, OLFIN EXP4300, OLFIN E1030W, and SILFACE SAG503A (produced by Nissin Chemical Industry Co., Ltd.), and at least one selected from these can be used alone or in combination.

The content of the surfactant in the ink jet textile-printing ink composition is preferably 0.4% by mass or more, more preferably 0.45% by mass or more and 1.2% by mass or less, and further preferably 0.5% by mass or more and 1.0% by mass or less.

Consequently, the ejection reliability of the ink jet textile-printing ink composition with respect to the ink jet method can be made more excellent, the color developability of the recorded portion formed using the ink jet textile-printing ink composition can be made more excellent, and a strike-through problem can be more efficiently prevented from occurring.

1-5. Other Components

The ink jet textile-printing ink composition according to the present disclosure may contain components other than the above-described components. Hereafter such components are also referred to as "other components".

Examples of the other component include coloring materials other than the above-described acidic dyes; ureas such as urea, ethylene urea, tetramethyl urea, and thiourea; chelating agents; preservatives; fungicides; rust inhibitors; flame retardants; various dispersing agents; antioxidants; ultraviolet absorbers; oxygen absorbers; solubilizing agents; and penetrants.

Examples of the coloring agent other than the above-described acidic dyes include acidic dyes having water solubility of more than 30 g/L at 20° C., dyes other than the acidic dyes, and pigments.

Examples of the chelating agent include ethylenediaminetetraacetate. Examples of the preservative or the fungicide include sodium benzoate, pentachlorophenol sodium, 2-pyridinethiol-1-oxide sodium, sodium sorbate, sodium dehydroacetate, 1,2-dibenzothiazolin-3-one, and 4-chloro-3-methylphenol. Examples of the rust inhibitor include benzotriazole.

Regarding the preservative or the fungicide, for example, a compound having an isothiazoline-ring structure in the molecule may be used.

The content of the other component is preferably 6.0% by mass or less, more preferably 5.0% by mass or less, and further preferably 2.0% by mass or less.

In this regard, the lower limit of the content of the other component is 0% by mass.

1-6. Others

There is no particular limitation regarding the surface tension at 20° C. of the ink jet textile-printing ink composition according to the present disclosure, and the surface tension is preferably 20 mN/m or more and 60 mN/m or less, more preferably 25 mN/m or more and 50 mN/m or less, and further preferably 30 mN/m or more and 40 mN/m or less.

Consequently, it becomes more difficult for plugging in an ink jet head nozzle to occur, and the ejection reliability of the ink jet textile-printing ink composition with respect to the ink jet method is further improved. In this regard, even when plugging in the nozzle occurs, recoverability due to the nozzle being capped can be made more excellent.

A value measured by a Wilhelmy method or a ring method can be taken as the surface tension. The surface tension can be measured using a surface tensiometer (for example, DY-300, DY-500, or DY-700 produced by Kyowa Interface Science Co., Ltd.).

The viscosity at 20° C. of the ink jet textile-printing ink composition according to the present disclosure is preferably 2 mPa·s or more and 10 mPa·s or less and more preferably 3 mPa·s or more and 8 mPa·s or less.

Consequently, the ejection reliability of the ink jet textile-printing ink composition with respect to the ink jet method can be made more excellent.

In this regard, the viscosity can be measured and determined by using a vibration-type viscometer, a rotation-type viscometer, a capillary-type viscometer, or a falling ball-type viscometer. For example, regarding the vibration-type viscometer, the viscosity can be determined in accordance with the measurement in conformity with JIS Z 8809.

The ink jet textile-printing ink composition according to the present disclosure is to be applied to ejection by an ink jet method. Examples of the ink jet method include an on-demand system, such as a charge deflection system, a continuous system, a piezoelectric system, and a Bubble Jet (registered trademark) system, and the ink jet textile-printing ink composition according to the present disclosure may be ejected from, in particular, an ink jet head including a piezoelectric vibrator.

Consequently, a coloring material or the like is effectively prevented from denaturing in the ink jet head, and the ejection reliability with respect to the ink jet method can be made more excellent.

2. Ink Jet Textile-Printing Ink Composition Set

Next, an ink jet textile-printing ink composition set according to the present disclosure will be described.

The ink jet textile-printing ink composition set according to the present disclosure includes a plurality of ink jet textile-printing ink compositions. In this regard, at least one ink jet textile-printing ink composition constituting the ink jet textile-printing ink composition set is the above-described ink jet textile-printing ink composition according to the present disclosure.

At least one ink jet textile-printing ink composition constituting the ink jet textile-printing ink composition set is to be the above-described ink jet textile-printing ink composition according to the present disclosure, and the ink jet textile-printing ink composition set according to the present disclosure may include an ink jet textile-printing ink composition other than the above-described ink jet textile-printing ink composition according to the present disclosure. In particular, the ink jet textile-printing ink composition set according to the present disclosure may include a plurality of ink jet textile-printing ink compositions according to the present disclosure, and, more favorably, all the constituent ink jet textile-printing ink compositions are ink jet textile-printing ink compositions according to the present disclosure.

The ink jet textile-printing ink composition set according to the present disclosure favorably includes three types of ink jet textile-printing ink compositions corresponding to the three primary colors, that is, cyan, magenta, and yellow. In this regard, the three primary colors may be further subdivided in accordance with the color density thereof. For example, in addition to cyan, magenta, and yellow, light cyan, light magenta, and light yellow may be included.

The ink jet textile-printing ink composition set according to the present disclosure may include an achromatic color ink, more specifically, a black ink.

3. Recording Method

Next, a recording method according to the present disclosure will be described.

The recording method according to the present disclosure includes an ejection step of ejecting the above-described ink jet textile-printing ink composition according to the present disclosure by an ink jet method so as to attach the ink jet textile-printing ink composition to a fabric and a dyeing step of fixing the above-described acidic dye to the fabric.

Consequently, a recording method in which it is difficult for plugging due to the ink jet textile-printing ink composition in an ink jet nozzle to occur, in which a solid content of the ink jet textile-printing ink composition can have favorable resolubility, even when the solid content is precipitated, and which can stably produce a recorded material having excellent wet color fastness and excellent reliability can be provided.

3-1. Ejection Step

In the ejection step, droplets of the ink jet textile-printing ink composition according to the present disclosure are ejected by an ink jet method, and the droplets are attached to a fabric serving as a recording medium. Consequently, a predetermined image is formed. A plurality of types of ink jet textile-printing ink compositions, for example, the ink jet textile-printing ink compositions according to the present disclosure, may be used for forming the image.

There is no particular limitation regarding the ink jet method for ejecting the ink jet textile-printing ink composition, and examples of the ink jet method include an on-demand system, such as a charge deflection system, a continuous system, a piezoelectric system, and a Bubble Jet (registered trademark) system.

3-2. Dyeing Step

In the dyeing step, the coloring material attached to the fabric is fixed.

The dyeing step is usually performed under a high-temperature humidification condition.

There is no particular limitation regarding the treatment temperature in the dyeing step, and the temperature is preferably 90° C. or higher and 150° C. or lower, more preferably 95° C. or higher and 130° C. or lower, and further preferably 98° C. or higher and 120° C. or lower.

Consequently, incidental denaturing, deterioration, and the like of, for example, the fabric serving as the recording medium and ink jet textile-printing ink composition are prevented from occurring, and, in addition, the coloring material can be more efficiently fixed.

There is no particular limitation regarding the treatment time of the dyeing step, and the time is preferably 1 min or more and 120 min or less, more preferably 2 min or more and 90 min or less, and further preferably 3 min or more and 60 min or less.

Consequently, the dyeing affinity of the coloring material for the fabric serving as the recording medium is made more excellent, and, in addition, the productivity of the recorded material can be made more excellent.

Regarding high-temperature humidification treatment in the dyeing step, various steamers, for example, DHe which is a steamer type produced by Mathis AG may be used.

The recording method according to the present disclosure may include steps other than the ejection step and the dyeing step, as the situation demands.

For example, a pretreatment step of pretreating the fabric serving as the recording medium may be included before the ejection step.

For example, a known pretreatment agent may be used for the pretreatment. In general, the pretreatment agent contains a paste, a pH adjuster, and a hydrotropic agent.

Regarding the paste, natural gums, starches, sea grasses, plant peels, cellulose derivatives, processed starches, processed natural gums, sodium alginate, algin derivatives, synthetic pastes, and emulsions may be used.

Examples of the natural gum include guar and locust bean. Examples of the sea grass include glue plants. Examples of the plant peel include pectic acid. Examples of the cellulose derivative include methyl cellulose, ethyl cellulose, hydroxyethyl cellulose, and carboxymethyl cellulose. Examples of the processed starch include roasted starches, α-starches, carboxymethyl starches, carboxyethyl starches, and hydroxyethyl starches. Examples of the processed natural gum include Shiraz gum-based materials and roast bean gum-based materials. Examples of the synthetic paste include polyvinyl alcohols and polyacrylic acid esters.

Regarding the pH adjuster, for example, acid ammonium salts such as ammonium sulfate and ammonium tartrate may be used.

Regarding the hydrotropic agent, various types of ureas such as alkyl ureas, for example, urea, dimethyl urea, thiourea, monomethyl thiourea, and dimethyl thiourea may be used.

In this regard, the pretreatment agent may further contain, for example, silica.

In addition, for example, after the dyeing step, as the situation demands, a washing step of washing the fabric to which the dye is fixed may be included.

The washing step can be performed by, for example, hand-washing, with tap water, the fabric to which the dye is fixed and thereafter immersing the fabric in a washing liquid in which a nonionic soaping agent is added to warm water at 40° C. or higher and 70° C. or lower under appropriate agitation. The immersion time in the washing liquid can be, for example, 5 min or more and 60 min or less. Thereafter, the washing agent can be removed by performing hand-washing while tap water is introduced into the washing liquid.

3-3. Fabric

Next, the fabric serving as a recording medium to which the ink jet textile-printing ink composition is applied will be described.

Regarding the fabric, various woven fabrics of, for example, plain weave, twill weave, satin weave, derivative plain weave, derivative twill weave, derivative satin weave, special weave, Jacquard weave, half double weave, double texture, multiple texture, warp pile weave, weft pile weave, and leno weave, can be used.

The thickness of the fiber constituting the fabric may be, for example, 10 d or more and 100 d or less.

Examples of the fiber constituting the fabric include synthetic fibers such as polyester fiber, nylon fiber, triacetate fiber, diacetate fiber, polyamide fiber, and cellulose fiber, regenerated fibers such as rayon, and natural fibers such as cotton, silk, and wool, and mixed spun materials of these may be used.

4. Recorded Material

The recorded material according to the present disclosure has a colored portion due to the ink jet textile-printing ink composition according to the present disclosure applied to the fabric by an ink jet method and may be produced using the above-described recording method.

Consequently, defects caused by defective ejection or the like with respect to the ink jet method are effectively prevented from occurring, and the recorded material having excellent wet color fastness can be provided.

The exemplary embodiments of the present disclosure are described above in detail, but the present disclosure is not limited to these.

EXAMPLES

Next, specific examples of the present disclosure will be described.

5. Preparation of Ink Jet Textile-Printing Ink Composition

Example 1

Each component presented in Table 1 was placed into a predetermined container at a predetermined ratio, and mixing and agitation were performed using a stirrer for 1 hour. Thereafter, filtration was performed using a membrane filter having a pore size of 1 μm (Omnipore Membrane Filter: JAWP, produced by Merck Millipore) so as to obtain an ink jet textile-printing ink composition having the composition presented in Table 1.

Examples 2 to 33

Ink jet textile-printing ink compositions were prepared in a manner akin to that of Example 1 except that the types of the components used for preparing the ink jet textile-printing ink compositions and the mixing ratio of the components were changed so as to obtain the compositions presented in Table 1 to Table 4.

Comparative Examples 1 to 9

Ink jet textile-printing ink compositions were prepared in a manner akin to that of Example 1 except that the types of the components used for preparing the ink jet textile-printing ink compositions and the mixing ratio of the components were changed so as to obtain the compositions presented in Table 5.

6. Evaluation

The ink jet textile-printing ink compositions of the examples and the comparative examples above were evaluated as described below.

6-1. Continuous Ejection Reliability (1)

The ink jet textile-printing ink composition of each of the above-described examples and comparative examples was introduced into an ink jet textile printer Monna Lisa Evo Tre 32-180 (produced by Seiko Epson Corporation), a roll of 100% silk cloth (twill, 50 to 60 g/m², width of 140 cm) subjected to pretreatment was set, and continuous printing was performed in a mode of 600×600 dpi, 2 Pass.

Regarding the pretreatment of the silk cloth, a treatment liquid produced by mixing 1% by mass of sodium alginate, 1% by mass of guar gum, 4% by mass of ammonium sulfate, 10% by mass of urea, and 84% by mass of water was applied to the fabric, squeezing at a pickup rate of 20% was performed using a mangle, and drying was performed.

The nozzle was checked every 100 m of feed amount of the silk cloth, and whether printing was normally performed without omission, curving, or the like was examined, and evaluation was performed in accordance with the following criteria.

A: a feed amount of the silk cloth normally printed was 1,000 m or more
B: a feed amount of the silk cloth normally printed was 500 m or more and less than 1,000 m
C: a feed amount of the silk cloth normally printed was 200 m or more and less than 500 m
D: a feed amount of the silk cloth normally printed was less than 200 m 6-2. Continuous Ejection Reliability (2)

The ink jet textile-printing ink composition of each of the above-described examples and comparative examples was introduced into an arbitrary color line (a line of Cyan, Magenta, Yellow, and Photo Black) of an ink jet printer EW-M770T (produced by Seiko Epson Corporation), Printer Paper "P" (A 4 size) produced by Fuji Xerox Co., Ltd., was set, and continuous printing was performed in a normal paper·standard mode.

The nozzle was checked every 1,000 sheets, and whether printing was normally performed without omission, curving, or the like was examined, and evaluation was performed in accordance with the following criteria.

A: the number of sheets normally printed was 5,000 or more
B: the number of sheets normally printed was 2,500 or more and less than 5,000
C: the number of sheets normally printed was 1,000 or more and less than 2,500
D: the number of sheets normally printed was less than 1,000

6-3. Ejection Recoverability

The ink jet textile-printing ink composition of each of the above-described examples and comparative examples was introduced into a cyan line of an ink jet printer EW-M770T (produced by Seiko Epson Corporation).

Subsequently, a cleaning operation was performed, and, on the way thereof, more specifically, when an ink jet head departed from a Cap portion and moved to a printing portion, the operation was forcibly stopped by removing a power supply cable.

After this state was left to stand for 2 weeks in an environment of 20° C./25% RH, the power supply cable was coupled again and the power was supplied. Thereafter, the number of times of cleaning required until normal ejection was performed was counted and evaluated in accordance with the following criteria.

A: ejection was recovered due to 4 or more times of cleaning
B: ejection was recovered due to 5 or more and less than 7 times of cleaning
C: ejection was recovered due to 8 or more and less than 10 times of cleaning
D: ejection was not recovered, even after 10 times of cleaning 6-4. Fastness Two types of fabrics, that is, (1) silk fabric (habutae silk 14 monme, produced by SHIKISENSHA CO., LTD.) and (2) nylon fabric (Nylon 6 taffeta, produced by SHIKISENSHA CO., LTD.), were prepared.

A pretreatment liquid as described below was applied to these fabrics, squeezing at a pickup rate of 20% was performed using a mangle, and drying was performed so as to obtain fabrics for producing recorded materials.

Sodium alginate: 1.0% by mass
Guar gum: 1.0% by mass
Ammonium sulfate: 4.0% by mass
Urea: 10% by mass
Water: 84% by mass An ink cartridge filled with the ink jet textile-printing ink composition of each of the above-described examples and comparative examples was installed to an ink jet textile printer "Monna-Lisa Evo Tre 16" produced by Seiko Epson Corporation, and the above-described fabrics for producing recorded materials were subjected to uniform solid printing in a printing mode of "900×600 dpi, 2 Pass" so that the amount of application per unit area was set to be 1.2 mg/cm$^2$.

After printing, steam treatment was performed at 100° C. for 30 min by using a steamer (DHe which is a steamer type produced by Mathis AG). Thereafter, unfixed dye was removed by water washing.

Further washing was performed for 10 min by using hot water containing 0.2% by mass of LACCOL STA (soaping agent; produced by MEISEI CHEMICAL WORKS, LTD.) at 55° C., and drying was performed so as to obtain printed fabrics serving as the recorded materials.

The resulting printed fabrics were subjected to a fastness test in conformity with JIS L 0844:2011 A-2 method, and evaluation was performed in accordance with the following criteria. In this regard, silk (No. 2-1) described in JIS L 0803 was used as the standard adjacent fabric.

A: the result of fastness is class 4 or higher
B: the result of fastness is class 3 or higher and lower than class 4
C: the result of fastness is class 2 or higher and lower than class 3
D: the result of fastness is lower than class 2

Table 1 to Table 5 collectively present these results and the composition of the ink jet textile-printing ink composition of each of the above-described examples and comparative examples. In the tables, the unit of the content of each component is % by mass, C.I. Acid Red 138 that is an acidic dye having water solubility at 20° C. of 19.0 g/L is denoted as "AR138", C.I. Acid Blue 140 that is an acidic dye having water solubility at 20° C. of 10.0 g/L is denoted as "AB140", C.I. Acid Red 407 that is an acidic dye having water solubility at 20° C. of 10.9 g/L is denoted as "AR407", C.I. Acid Violet 97 that is an acidic dye having water solubility at 20° C. of 30.0 g/L is denoted as "AV97", C.I. Acid Violet 54 that is an acidic dye having water solubility at 20° C. of 2.3 g/L is denoted as "AV54", C.I. Acid Violet 48 that is an acidic dye having water solubility at 20° C. of 36.3 g/L is denoted as "AV48", C.I. Acid Yellow 79 that is an acidic dye having water solubility at 20° C. of 106 g/L is denoted as "AY79", C.I. Disperse Blue 87 that is a disperse dye having water solubility at 20° C. of 485 g/L is denoted as "DB87", diethylene glycol that is a compound having a glycol structure is denoted as "DEG", triethylene glycol monobutyl ether that is a compound having a glycol ether structure is denoted as "BTG", diethylene glycol monobutyl ether that is a compound having a glycol ether structure is denoted as "BDG", dipropylene glycol monobutyl ether that is a compound having a glycol ether structure is denoted as "BFDG", dipropylene glycol monopropyl ether that is a compound having a glycol ether structure is denoted as "PFDG", ε-caprolactam that is a cyclic-amide-based solvent is denoted as "ECL", N-hydroxyethyl-2-pyrrolidone that is a cyclic-amide-based solvent is denoted as "HEP", 2-pyrrolidone that is a cyclic-amide-based solvent is denoted as "2PY", N-methyl-2-pyrrolidone that is a cyclic-amide-based solvent is denoted as "NMP", 1,3-dimethyl imidazolidinone that is a cyclic-amide-based solvent is denoted as "DMI", glycerin is denoted as "Gly", OLFIN E1010 (produced by Nissin Chemical Industry Co., Ltd.) that is an acetylene-glycol-based surfactant is denoted as "E1010", triethanolamine is denoted as "TEA", Proxel XL-2 (produced by Lonza) is denoted as "XL2", benzotriazole that is a rust inhibitor is denoted as "BTA", and ethylenediaminetetraacetate that is a chelating agent is denoted as "EDTA". In addition, Table 1 to Table 5 also present the value of XL/XG, where the content of the glycol-based solvent in the ink jet textile-printing ink composition is denoted as XG (% by mass) and the content of the cyclic-amide-based solvent is denoted as XL (% by mass). In this regard, the ink jet textile-printing ink composition of each of the above-described examples had a value of the surface tension within the range of 30 mN/m or more and 40 mN/m or less and a value of the viscosity at 20° C. within the range of 3 mPa·s or more and 8 mPa·s or less. The surface tension was measured using a surface tensiometer (DY-300 produced by Kyowa Interface Science Co., Ltd.) by a Wilhelmy method, and the viscosity was measured using a vibration-type viscometer (VM-100 produced by SEKONIC CORPORATION) in conformity with JIS Z 8809.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Content | Coloring material | AR138 | 4.5 | 4.5 | 4.5 | 4.5 | 4.5 | 4.5 | — | — | 2.5 | 4.5 |
| | | AB140 | — | — | — | — | — | — | 7.0 | — | — | — |
| | | AR407 | — | — | — | — | — | — | — | 4.5 | — | — |
| | | AV54 | — | — | — | — | — | — | — | — | 1.5 | — |
| | | AV48 | — | — | — | — | — | — | — | — | — | — |
| | | AY79 | — | — | — | — | — | — | — | — | — | — |
| | | DB87 | — | — | — | — | — | — | — | — | — | — |
| | Glycol-based solvent | DEG | 8.0 | 8.0 | 8.0 | 4.0 | 8.0 | 8.0 | 8.0 | 8.0 | 8.0 | 8.0 |
| | | BTG | 10.0 | 10.0 | 10.0 | 10.0 | 6.0 | 6.0 | 9.5 | 9.5 | 9.5 | — |
| | | BDG | — | — | — | — | — | — | — | — | — | 10.0 |
| | | BFDG | — | — | — | — | — | — | — | — | — | — |
| | | PFDG | — | — | — | — | — | — | — | — | — | — |
| | Cyclic-amide-based solvent | 2PY | — | — | — | — | — | — | — | — | — | — |
| | | NMP | — | — | — | — | — | — | — | — | — | — |
| | | DMI | — | — | — | — | — | — | — | — | — | — |
| | | HEP | 1.5 | 1.0 | 2.0 | 4.0 | 4.0 | 2.0 | 1.5 | 1.5 | 1.5 | 1.5 |
| | | εCL | — | 0.5 | 2.0 | — | — | 2.0 | — | — | — | — |
| | Gly | | 11.0 | 11.0 | 11.0 | 11.0 | 11.0 | 11.0 | 8.0 | 11.0 | 11.0 | 11.0 |
| | Other components | E1010 | 1.0 | 1.0 | 1.0 | 1.0 | 1.0 | 1.0 | 1.0 | 1.0 | 1.0 | 1.0 |
| | | TEA | 0.5 | 0.5 | 0.5 | 0.5 | 0.5 | 0.5 | 0.5 | 0.5 | 0.5 | 0.5 |
| | | XL2 | 0.1 | 0.1 | 0.1 | 0.1 | 0.1 | 0.1 | 0.1 | 0.1 | 0.1 | 0.1 |
| | | BTA | 0.01 | 0.01 | 0.01 | 0.01 | 0.01 | 0.01 | 0.01 | 0.01 | 0.01 | 0.01 |
| | | EDTA | 0.02 | 0.02 | 0.02 | 0.02 | 0.02 | 0.02 | 0.02 | 0.02 | 0.02 | 0.02 |
| | Water | | rest | rest | rest | rest | rest | rest | rest | rest | rest | rest |
| XG/XL | | | 12.0 | 12.0 | 4.5 | 3.5 | 3.5 | 3.5 | 11.7 | 11.7 | 11.7 | 12.0 |
| Evaluation | Continuous ejection reliability (1) | | A | A | A | A | A | A | A | A | A | C |
| | Continuous ejection reliability (2) | | A | A | A | A | A | A | A | A | A | B |
| | Ejection recoverability | | A | A | A | A | A | A | A | A | A | B |
| | Fastness | Silk | A | A | A | A | A | A | A | A | A | B |
| | | Nylon | A | A | A | A | A | A | A | A | A | A |

TABLE 2

| | | | Example | | | | | | | | | |
|---|---|---|---|---|---|---|---|---|---|---|---|---|
| | | | 11 | 12 | 13 | 14 | 15 | 16 | 17 | 18 | 19 | 20 |
| Content | Coloring material | AR138 | 4.5 | 4.5 | 2.5 | 4.5 | — | — | 2.5 | 4.5 | 4.5 | 4.5 |
| | | AB140 | — | — | — | — | 7.0 | — | — | — | — | — |
| | | AR407 | — | — | — | — | — | 4.5 | — | — | — | — |
| | | AV54 | — | — | 1.5 | — | — | — | 1.5 | — | — | — |
| | | AV48 | — | — | — | — | — | — | — | — | — | — |
| | | AY79 | — | — | — | — | — | — | — | — | — | — |
| | | DB87 | — | — | — | — | — | — | — | — | — | — |
| | Glycol-based solvent | DEG | 8.0 | 8.0 | 8.0 | — | 8.0 | 8.0 | 8.0 | 8.0 | 8.0 | 8.0 |
| | | BTG | — | — | — | 10.0 | 9.5 | 9.5 | 9.5 | — | — | — |
| | | BDG | — | — | 9.5 | — | — | — | — | 10.0 | — | — |
| | | BFDG | 10.0 | — | — | — | — | — | — | — | 10.0 | — |
| | | PFDG | — | 10.0 | — | — | — | — | — | — | — | 10.0 |
| | Cyclic-amide-based solvent | 2PY | — | — | — | — | — | — | — | — | — | — |
| | | NMP | — | — | — | — | — | — | — | — | — | — |
| | | DMI | — | — | — | — | — | — | — | — | — | — |
| | | HEP | 1.5 | 1.5 | 1.5 | — | — | — | — | — | — | — |
| | | εCL | — | — | — | 1.5 | 1.5 | 1.5 | 1.5 | 1.5 | 1.5 | 1.5 |

TABLE 2-continued

|  |  |  | Example | | | | | | | | | |
|---|---|---|---|---|---|---|---|---|---|---|---|---|
|  |  |  | 11 | 12 | 13 | 14 | 15 | 16 | 17 | 18 | 19 | 20 |
|  | Gly |  | 11.0 | 11.0 | 11.0 | 11.0 | 8.0 | 11.0 | 11.0 | 11.0 | 11.0 | 11.0 |
|  | Other components | E1010 | 1.0 | 1.0 | 1.0 | 1.0 | 1.0 | 1.0 | 1.0 | 1.0 | 1.0 | 1.0 |
|  |  | TEA | 0.5 | 0.5 | 0.5 | 0.5 | 0.5 | 0.5 | 0.5 | 0.5 | 0.5 | 0.5 |
|  |  | XL2 | 0.1 | 0.1 | 0.1 | 0.1 | 0.1 | 0.1 | 0.1 | 0.1 | 0.1 | 0.1 |
|  |  | BTA | 0.01 | 0.01 | 0.01 | 0.01 | 0.01 | 0.01 | 0.01 | 0.01 | 0.01 | 0.01 |
|  |  | EDTA | 0.02 | 0.02 | 0.02 | 0.02 | 0.02 | 0.02 | 0.02 | 0.02 | 0.02 | 0.02 |
|  | Water |  | rest | rest | rest | rest | rest | rest | rest | rest | rest | rest |
| XG/XL |  |  | 12.0 | 12.0 | 11.7 | 12.0 | 11.7 | 11.7 | 11.7 | 12.0 | 12.0 | 12.0 |
| Evaluation | Continuous ejection reliability (1) |  | B | B | C | A | A | A | A | C | B | B |
|  | Continuous ejection reliability (2) |  | B | B | B | A | A | A | A | B | B | B |
|  | Ejection recoverability |  | A | B | B | A | A | A | A | B | A | A |
|  | Fastness | Silk | A | A | A | A | A | A | A | A | A | A |
|  |  | Nylon | A | A | A | A | A | A | A | A | A | A |

TABLE 3

|  |  |  | Example | | | | | | |
|---|---|---|---|---|---|---|---|---|---|
|  |  |  | 21 | 22 | 23 | 24 | 25 | 26 | 27 |
| Content | Coloring material | AR138 | 2.5 | — | — | 2.5 | — | — | 2.5 |
|  |  | AB140 | — | 7.0 | — | — | 7.0 | — | — |
|  |  | AR407 | — | — | 4.5 | — | — | 4.5 | — |
|  |  | AV54 | 1.5 | — | — | 1.5 | — | — | 1.5 |
|  |  | AV48 | — | — | — | — | — | — | — |
|  |  | AY79 | — | — | — | — | — | — | — |
|  |  | DB87 | — | — | — | — | — | — | — |
|  | Glycol-based solvent | DEG | 8.0 | 17.5 | 17.5 | 17.5 | — | — | — |
|  |  | BTG | — | — | — | — | 17.5 | 17.5 | 17.5 |
|  |  | BDG | 9.5 | — | — | — | — | — | — |
|  |  | BFDG | — | — | — | — | — | — | — |
|  |  | PFDG | — | — | — | — | — | — | — |
|  | Cyclic-amide-based solvent | 2PY | — | — | — | — | — | — | — |
|  |  | NMP | — | — | — | — | — | — | — |
|  |  | DMI | — | — | — | — | — | — | — |
|  |  | HEP | — | 1.5 | 1.5 | 1.5 | — | — | — |
|  |  | εCL | 1.5 | — | — | — | 1.5 | 1.5 | 1.5 |
|  | Gly |  | 11.0 | 8.0 | 11.0 | 11.0 | 8.0 | 11.0 | 11.0 |
|  | Other components | E1010 | 1.0 | 1.0 | 1.0 | 1.0 | 1.0 | 1.0 | 1.0 |
|  |  | TEA | 0.5 | 0.5 | 0.5 | 0.5 | 0.5 | 0.5 | 0.5 |
|  |  | XL2 | 0.1 | 0.1 | 0.1 | 0.1 | 0.1 | 0.1 | 0.1 |
|  |  | BTA | 0.01 | 0.01 | 0.01 | 0.01 | 0.01 | 0.01 | 0.01 |
|  |  | EDTA | 0.02 | 0.02 | 0.02 | 0.02 | 0.02 | 0.02 | 0.02 |
|  | Water |  | rest | rest | rest | rest | rest | rest | rest |
| XG/XL |  |  | 11.7 | 11.7 | 11.7 | 11.7 | 11.7 | 11.7 | 11.7 |
| Evaluation | Continuous ejection reliability (1) |  | C | A | A | A | A | A | A |
|  | Continuous ejection reliability (2) |  | B | A | A | A | A | A | A |
|  | Ejection recoverability |  | B | A | A | A | A | A | A |
|  | Fastness | Silk | A | A | A | A | A | A | A |
|  |  | Nylon | A | A | A | A | A | A | A |

TABLE 4

|  |  |  | Example | | | | | |
|---|---|---|---|---|---|---|---|---|
|  |  |  | 28 | 29 | 30 | 31 | 32 | 33 |
| Content | Coloring material | AR138 | 2.5 | 2.5 | 2.5 | 2.5 | 2.5 | 2.5 |
|  |  | AB140 | — | — | — | — | — | — |
|  |  | AR407 | — | — | — | — | — | — |
|  |  | AV54 | — | — | — | — | — | — |
|  |  | AV48 | — | — | — | — | — | — |
|  |  | AY79 | — | — | — | — | — | — |
|  |  | DB87 | — | — | — | — | — | — |
|  |  | AV97 | 1.5 | 1.5 | 1.5 | 1.5 | 1.5 | 1.5 |

TABLE 4-continued

|  |  |  | Example | | | | | |
|---|---|---|---|---|---|---|---|---|
|  |  |  | 28 | 29 | 30 | 31 | 32 | 33 |
| Content | Glycol-based solvent | DEG | 8.0 | 8.0 | 8.0 | 8.0 | 17.5 | 17.5 |
|  |  | BTG | 9.5- | — | — | — | — | — |
|  |  | BDG | — | 9.5 | 10.0 | 9.5 | — | — |
|  |  | BFDG | — | — | — | — | — | — |
|  |  | PFDG | — | — | — | — | — | — |
|  | Cyclic-amide-based solvent | 2PY | — | — | — | — | — | — |
|  |  | NMP | — | — | — | — | — | — |
|  |  | DMI | — | — | — | — | — | — |
|  |  | HEP | 1.5 | 1.5 | — | — | 1.5 | — |
|  |  | εCL | — | — | 1.5 | 1.5 | — | 1.5 |
|  | Gly |  | 11.0 | 11.0 | 11.0 | 11.0 | 11.0 | 11.0 |
|  | Other components | E1010 | 1.0 | 1.0 | 1.0 | 1.0 | 1.0 | 1.0 |
|  |  | TEA | 0.5 | 0.5 | 0.5 | 0.5 | 0.5 | 0.5 |
|  |  | XL2 | 0.1 | 0.1 | 0.1 | 0.1 | 0.1 | 0.1 |
|  |  | BTA | 0.01 | 0.01 | 0.01 | 0.01 | 0.01 | 0.01 |
|  |  | EDTA | 0.02 | 0.02 | 0.02 | 0.02 | 0.02 | 0.02 |
|  | Water |  | rest | rest | rest | rest | rest | rest |
| XG/XL |  |  | 11.7 | 11.7 | 11.7 | 11.7 | 11.7 | 11.7 |
| Evaluation | Continuous ejection reliability (1) |  | A | C | A | C | A | A |
|  | Continuous ejection reliability (2) |  | A | B | A | B | A | A |
|  | Ejection recoverability |  | A | B | A | B | A | A |
|  | Fastness | Silk | A | A | A | A | A | A |
|  |  | Nylon | A | A | A | A | A | A |

TABLE 5

|  |  |  | Comparative example | | | | | | | | |
|---|---|---|---|---|---|---|---|---|---|---|---|
|  |  |  | 1 | 2 | 3 | 4 | 5 | 6 | 7 | 8 | 9 |
| Content | Coloring material | AR138 | 4.5 | — | — | — | — | — | 4.5 | 4.5 | 4.5 |
|  |  | AB140 | — | 7.0 | — | — | — | — | — | — | — |
|  |  | AR407 | — | — | 4.5 | — | — | — | — | — | — |
|  |  | AV54 | — | — | — | — | — | — | — | — | — |
|  |  | AV48 | — | — | — | — | — | 4.5 | — | — | — |
|  |  | AY79 | — | — | — | 7.0 | — | — | — | — | — |
|  |  | DB87 | — | — | — | — | 7.0 | — | — | — | — |
|  | Glycol-based solvent | DEG | 8.0 | 8.0 | 8.0 | 8.0 | 8.0 | 8.0 | — | 9.0 | — |
|  |  | BTG | 9.5 | 9.5 | 9.5 | 9.5 | 9.5 | 10.0 | — | — | 9.0 |
|  |  | BDG | — | — | — | — | — | — | — | — | — |
|  |  | BFDG | — | — | — | — | — | — | — | — | — |
|  |  | PFDG | — | — | — | — | — | — | — | — | — |
|  | Cyclic-amide-based solvent | 2PY | — | — | — | — | — | — | — | — | — |
|  |  | NMP | — | — | — | — | — | — | — | — | — |
|  |  | DM | — | — | — | — | — | — | — | — | — |
|  |  | HEP | — | — | — | 1.5 | 1.5 | 1.5 | 1.5 | 1.5 | 1.5 |
|  |  | εCL | — | — | — | — | — | — | — | — | — |
|  | Gly |  | 11.0 | 8.0 | 11.0 | 8.0 | 8.0 | 11.0 | 15.0 | 15.0 | 15.0 |
|  | Other components | E1010 | 1.0 | 1.0 | 1.0 | 1.0 | 1.0 | 1.0 | 1.0 | 1.0 | 1.0 |
|  |  | TEA | 0.5 | 0.5 | 0.5 | 0.5 | 0.5 | 0.5 | 0.5 | 0.5 | 0.5 |
|  |  | XL2 | 0.1 | 0.1 | 0.1 | 0.1 | 0.1 | 0.1 | 0.1 | 0.1 | 0.1 |
|  |  | BTA | 0.01 | 0.01 | 0.01 | 0.01 | 0.01 | 0.01 | 0.01 | 0.01 | 0.01 |
|  |  | EDTA | 0.02 | 0.02 | 0.02 | 0.02 | 0.02 | 0.02 | 0.02 | 0.02 | 0.02 |
|  | Water |  | rest | rest | rest | rest | rest | rest | rest | rest | rest |
| XG/XL |  |  | — | — | — | 11.7 | 11.7 | 12.0 | 0.0 | 6.0 | 6.0 |
| Evaluation | Continuous ejection reliability (1) |  | D | D | D | A | A | A | A | D | D |
|  | Continuous ejection reliability (2) |  | D | D | D | A | A | A | A | D | D |
|  | Ejection recoverability |  | A | A | A | A | A | A | D | A | A |
|  | Fastness | Silk | A | A | A | D | D | D | A | A | A |
|  |  | Nylon | A | A | A | D | D | D | A | A | A |

As is clear from Table 1 to Table 5, excellent results were obtained in the present disclosure, whereas satisfactory results were not obtained in comparative examples.

What is claimed is:

1. An ink jet textile-printing ink composition comprising:
an acidic dye having water solubility of 30 g/L or less at 20° C.;
a water-soluble organic solvent; and
water, wherein
a glycol-based solvent and a cyclic-amide-based solvent are contained as the water-soluble organic solvent,
the cyclic-amide-based solvent contains one or both of ε-caprolactam and N-hydroxyethyl-2-pyrrolidone,
the acidic dye is at least one selected from the group consisting of C.I. Acid Red 407 and C.I. Acid Violet 97,
a content of the glycol-based solvent in the ink jet textile-printing ink composition is denoted as XG (% by mass), a content of the cyclic-amide-based solvent is denoted as XL (% by mass), and
$11.7 \leq XG/XL \leq 50.0$.

2. The ink jet textile-printing ink composition according to claim 1, wherein
a content of the glycol-based solvent is 10% by mass or more.

3. The ink jet textile-printing ink composition according to claim 1, wherein
a content of the cyclic-amide-based solvent is 0.5% by mass or more.

4. The ink jet textile-printing ink composition according to claim 1, wherein
a compound having a glycol structure and a compound having a glycol ether structure are contained as the glycol-based solvent.

5. The ink jet textile-printing ink composition according to claim 1, wherein
the glycol-based solvent is at least one selected from the group consisting of diethylene glycol, triethylene glycol, dipropylene glycol, tripropylene glycol, triethylene glycol monobutyl ether, diethylene glycol monobutyl ether, dipropylene glycol monobutyl ether, and dipropylene glycol monopropyl ether.

6. The ink jet textile-printing ink composition according to claim 1, wherein
a content of the acidic dye is 7.0% by mass or less.

7. The ink jet textile-printing ink composition according to claim 1, further comprising:
a surfactant with a content of 0.4% by mass or more.

8. A recording method comprising:
an ejection step of ejecting the ink jet textile-printing ink composition according to claim 1 by an ink jet method so as to attach the ink jet textile-printing ink composition to a fabric and
a dyeing step of fixing the acidic dye to the fabric.

9. A recorded material comprising:
a colored portion due to the ink jet textile-printing ink composition according to claim 1 applied to a fabric by an ink jet method.

* * * * *